United States Patent
Palm (10) Patent No.: US 10,846,550 B2
(45) Date of Patent: Nov. 24, 2020

(54) OBJECT CLASSIFICATION FOR IMAGE RECOGNITION PROCESSING

(71) Applicant: Google LLC, Mountain View, CA (US)

(72) Inventor: Jeffrey Palm, San Francisco, CA (US)

(73) Assignee: Google LLC, Mountain View, CA (US)

( * ) Notice: Subject to any disclaimer, the term of this patent is extended or adjusted under 35 U.S.C. 154(b) by 234 days.

(21) Appl. No.: 16/021,163

(22) Filed: Jun. 28, 2018

(65) Prior Publication Data

US 2020/0005065 A1   Jan. 2, 2020

(51) Int. Cl.
G06K 9/20 (2006.01)
G06F 3/16 (2006.01)
G06K 9/00 (2006.01)
G06K 9/32 (2006.01)
G06K 9/62 (2006.01)

(52) U.S. Cl.
CPC ........... *G06K 9/2081* (2013.01); *G06F 3/167* (2013.01); *G06K 9/00671* (2013.01); *G06K 9/325* (2013.01); *G06K 9/6267* (2013.01)

(58) Field of Classification Search
CPC .. G06K 9/2081; G06K 9/00671; G06K 9/325; G06K 9/6267
See application file for complete search history.

(56) References Cited

U.S. PATENT DOCUMENTS

| | | | | |
|---|---|---|---|---|
| 5,848,186 A * | 12/1998 | Wang | ................. | G06K 9/00463 382/176 |
| 5,999,664 A | 12/1999 | Mahoney et al. | | |
| 7,305,129 B2 * | 12/2007 | Chellapilla | ........... | G06F 40/174 382/174 |
| 9,355,336 B1 | 5/2016 | Jahagirdar et al. | | |
| 9,547,644 B2 | 1/2017 | Cuthbert et al. | | |
| 2012/0088543 A1 | 4/2012 | Linder et al. | | |
| 2014/0033007 A1 * | 1/2014 | Mhatre | ................. | G06F 16/957 715/205 |
| 2015/0193510 A1 * | 7/2015 | Raess | .................... | G06F 16/248 707/727 |
| 2015/0213610 A1 * | 7/2015 | Guo | ................... | G06K 9/00463 382/173 |
| 2015/0381898 A1 | 12/2015 | Anderson et al. | | |
| 2017/0270193 A1 * | 9/2017 | Misra | .................... | G06F 16/338 |
| 2018/0096060 A1 * | 4/2018 | Peled | .................... | G06F 16/353 |
| 2020/0097713 A1 * | 3/2020 | Cramer | .............. | G06K 9/00449 |
| 2020/0117884 A1 * | 4/2020 | Adato | ................ | G06K 9/00201 |

OTHER PUBLICATIONS

'www.cnet.com' [online] "Translate foreign menus," Donald Bell, Apr. 11, 2014, [retrieved on Jun. 26, 2018] Retrieved from Internet: URL<https://www.cnet.com/how-to/translate-foreign-menus/> 4 pages.
PCT International Search Report and Written Opinion in International Application No. PCT/US2019/037194, dated Sep. 17, 2019, 12 pages.

* cited by examiner

Primary Examiner — Kim Y Vu
Assistant Examiner — Molly Delaney
(74) Attorney, Agent, or Firm — Fish & Richardson P.C.

(57) ABSTRACT

Methods, systems, and apparatus, including computer programs encoded on a computer storage medium, for receiving user input for an object classification of interest for image data (e.g. single frame image, continuous video, etc.) from a user device, and for each object specified by identified object data to belong to the object classification of interest, displaying data that presents each object and/or text block of interest on a user device.

18 Claims, 4 Drawing Sheets

OBJECT CLASSIFICATION FOR IMAGE RECOGNITION PROCESSING

BACKGROUND

Many user devices, such as smartphones, come equipped with a camera for capturing pictures and digital images. User devices provide access to a wide variety of information. This information may be viewed in web browsers or native applications running on a user device. Users can also use the images to obtain additional information related to an object or location. For example, digital image files, video and/or audio files, as well as resources for particular subjects are accessible over the Internet.

A user may desire additional information related to content that a user is viewing on a user device. Such content may be either textual or an image. The user may desire to have the objects and/or text blocks of interest highlighted on the user device or some other feature that is indicative of information that may be useful to the user. For example, a user may encounter a food menu at a restaurant and desire to know additional information about particular items of interest, or to highlight a particular subset of items based on a classification.

SUMMARY

This specification describes technologies relating to an object classifier that can receive image data and user input of a request to find an item of interest in the image data on a user device, determine whether there are objects and/or text blocks of interest within the image data, and display those objects and/or text blocks of interest on a user device.

In general, one innovative aspect of the subject matter described in this specification can be embodied in a system that includes a specification executer component that receives, as input, object mapping data from an image recognition processing component, wherein the object mapping data specifies, for each object recognized in an image and according to a defined data structure, a region of the image the object occupies and data identifying the object; receives, as input, a specification file that includes data that specifies an object classification of interest; determines whether the object mapping data generated by the image recognition processing component specifies an object that belongs to the object classification of interest; and generates, as output, identified object data that specifies each object determined to belong to the object classification of interest; and a presentation component that: receives, as input, the identified object data and, for each object specified by the identified object data that is determined to belong to the object classification of interest, the object mapping data specifying the region of the image the object occupies; and for each object specified by the identified object data to belong to the object classification of interest, generates presentation data that presents the object on a user device. Other embodiments of this aspect include corresponding systems, apparatus, and computer programs, configured to perform the actions of the methods, encoded on computer storage devices.

These and other implementations can each optionally include one or more of the following features. In some aspects, the system can include the image recognition processing component. The image recognition processing component can receive, as input, image data and processes the image data of an image that depicts a plurality of objects, and generate, as output, object mapping data that specifies, according to a defined data structure and for each object recognized in the image, a region of the image the object occupies and data identifying the object.

In some aspects, the system can include the library generator. The library generator can receive user input specifying one or more object classifications of interest, receive user input specifying a presentation mode for presenting each object depicted in an image that is determined to belong to the object classification of interest, and generate, based on the user input specifying one or more object classifications of interest and the user input specifying the presentation mode, a specification file. In some aspects, the data generated by the presentation component to present the object of interest is data that is generated according to the presentation mode specified in the specification file.

In some aspects, the presentation component causes the user device to highlight, within the image, the object depicted in the image that is determined to belong to the object classification of interest. In some aspects, the presentation component causes the user device to audibly describe the object depicted in the image that is determined to belong to the object classification of interest.

In some aspects, the object classification of interest defines a text classification of interest and wherein the presentation component causes the user device to highlight, within the image, the object depicted in the image that is determined to belong to the text classification of interest. In some aspects, the object is one or more of text or a real-world physical object.

Particular embodiments of the subject matter described in this specification can be implemented so as to realize one or more of the following advantages. By facilitating a platform through which developers may deploy object classifiers and specification executors, the system allows for the rapid development and deployment of specialized object recognition and presentation capabilities to end users. This unconventional development and execution architecture results in a technical improvement in the field of image processing.

In some implementations, an object classifier can receive image data (single frame image, continuous video, etc.) and user input of a request to find an item of interest in the image data on a user device, determine whether there are objects and/or text blocks of interest within the image data, and display those objects and/or text blocks of interest on a user device. In some implementations, displaying the objects and/or text blocks of interest can be based on user input of defining a presentation mode. The presentation mode may include any type of visual or audible feedback to signal to the user that an objects and/or text blocks of interest is in the image data. Additionally, the object classifier can provide additional information to the user related to the objects and/or text blocks of interest.

In some implementations, by taking advantage of a network effect, the more users that use the object classifier system, the more value the object classifier system will have. The object classifier system described herein is more akin to a mobile application platform that allows programmers to build a variety of plugin modules that a user can add-on for the object classifier application to access on a user device. In some implementations, users can make identification requests for items of interest for plugin modules that may not be created yet, so that programmers and/or developers can create the plugin modules to fulfill the needs as requested.

Additionally, the object classification system, by providing users with an indication of an object of interest to users who may not otherwise notice the object in the image or view finder of the phone, provides users with information that can assist users in several different ways. For example, by providing audible feedback as opposed to only visual feedback, someone who may be visually impaired (e.g., far sighted and temporarily without corrective lenses) is able to distinguish an object or text block of interest that they would otherwise not be able to.

Also, by using previously used classifier searches or modules already created, the system reduces the number of classifier processing cycles, as users are better informed with respect to information presented to them. This reduces processing resources required and reduces overall system bandwidth requirements (or, alternatively, enables a larger number of users to be serviced without a commensurate increase in processing resources). This improvement in the technological field of search processing is thus another distinct advantage realized by the systems and methods described below.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for receiving user input for an object classification of interest for image data (e.g. single frame image, continuous video, etc.) from a user device, and for each object specified by identified object data to belong to the object classification of interest, displaying data that presents each object and/or text block of interest on a user device.

The system can determine how to present the objects and/or text blocks of interest to the user based on the arrangement and/or other visual characteristics of the text or objects within the image. For example, based on user input specifying one or more objects or text of interest and user input specifying a presentation mode (e.g., highlight, illuminate, circle, etc.), the system determines whether the image data contains an object or text that the user was interested in. These and other characteristics described herein can provide insight into the context of the image and its text/objects contained therein.

To perform the above operations, the systems and methods utilizes a configurable object classification for image recognition processing. In particular, the system includes a specification executer component and a presentation component. The specification executer component processes a specification file. The specification file includes data that specifies an object classification of interest and what presentations are to be generated when an object belong to the classification is identified.

In operation, an image recognition processing component processes an image and generates object mapping data. The object mapping data specifies the region of the image the object occupies. The specification executer receives object mapping data from the image recognition processing component and processes the specification file. Should the specification file specify that the detected object is one that belongs to an object classification of interest, then the specification executor component generates identified object data that specifies each object determined to belong to the object classification of interest. The presentation component receives the identified object data and data specifying each object that is determined to belong to the object classification of interest.

The identified object data is provided to a presentation component that receives the identified object data and the object mapping data. For each object specified by the identified object data to belong to the object classification of interest, the presentation component generates presentation data that presents the object on a user device.

The system can also include a library generator that receives the object classifications of interest and/or a presentation mode from a developer to generate a specification file to send to the specification executer component. When an object depicted in the image is determined to belong to the object classification of interest, the system can identify in the image the specific portions of interest with either a circle around the object, highlight the object, or the system could audibly describe the object. The image data received can be a single frame shot or a recorded video. In other implementations, the image data received would be from live continuous video requiring the system to perform on-the-fly processing, that would, even if the screen moves, continue to identify the object(s) of interest while still in the view finder of the user device.

These features and additional features are described in more detail below.

Figure 1A:
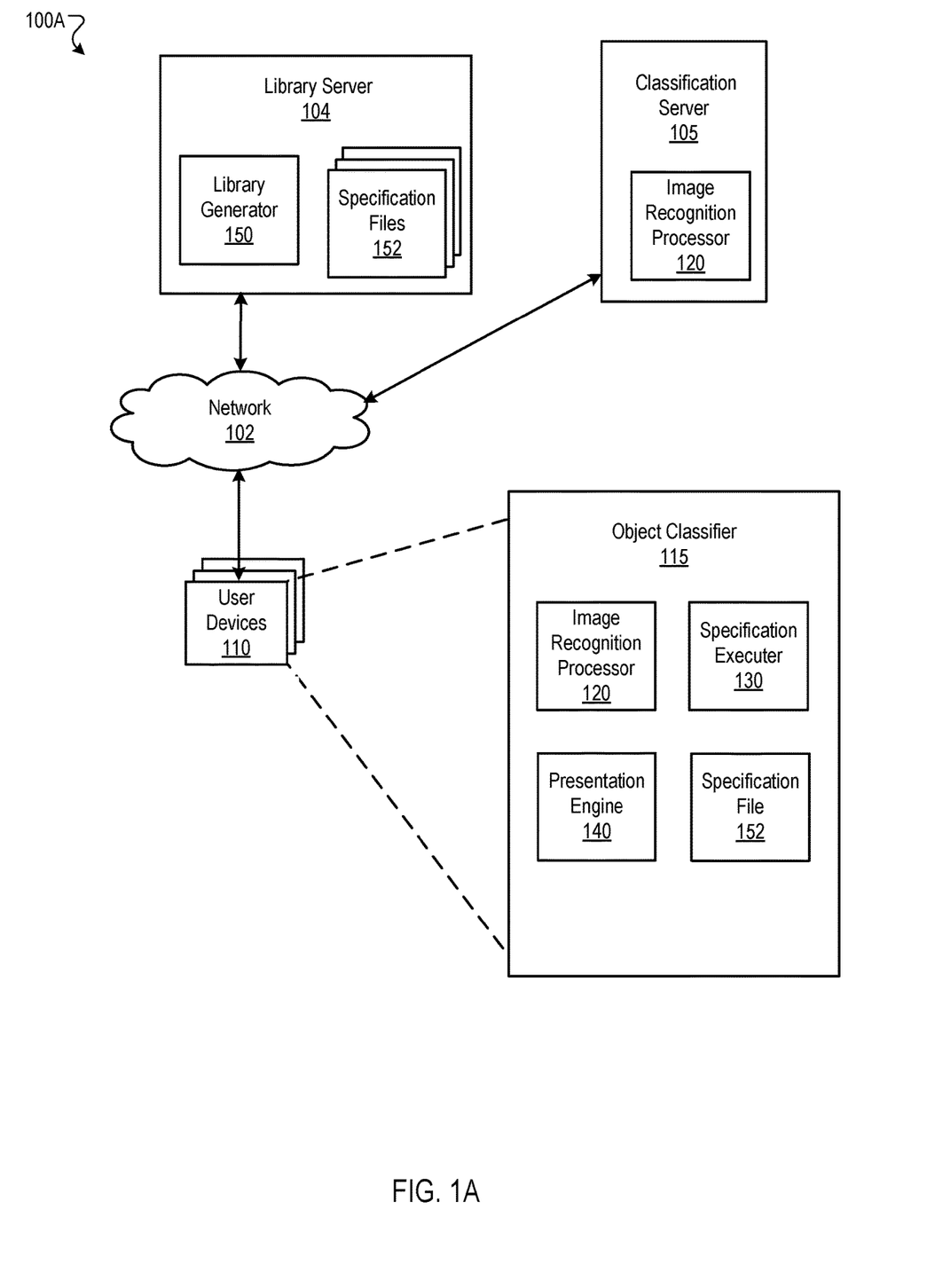
FIG. 1A is a block diagram of an example environment in which an object classifier can be implemented.
Figure 1B:
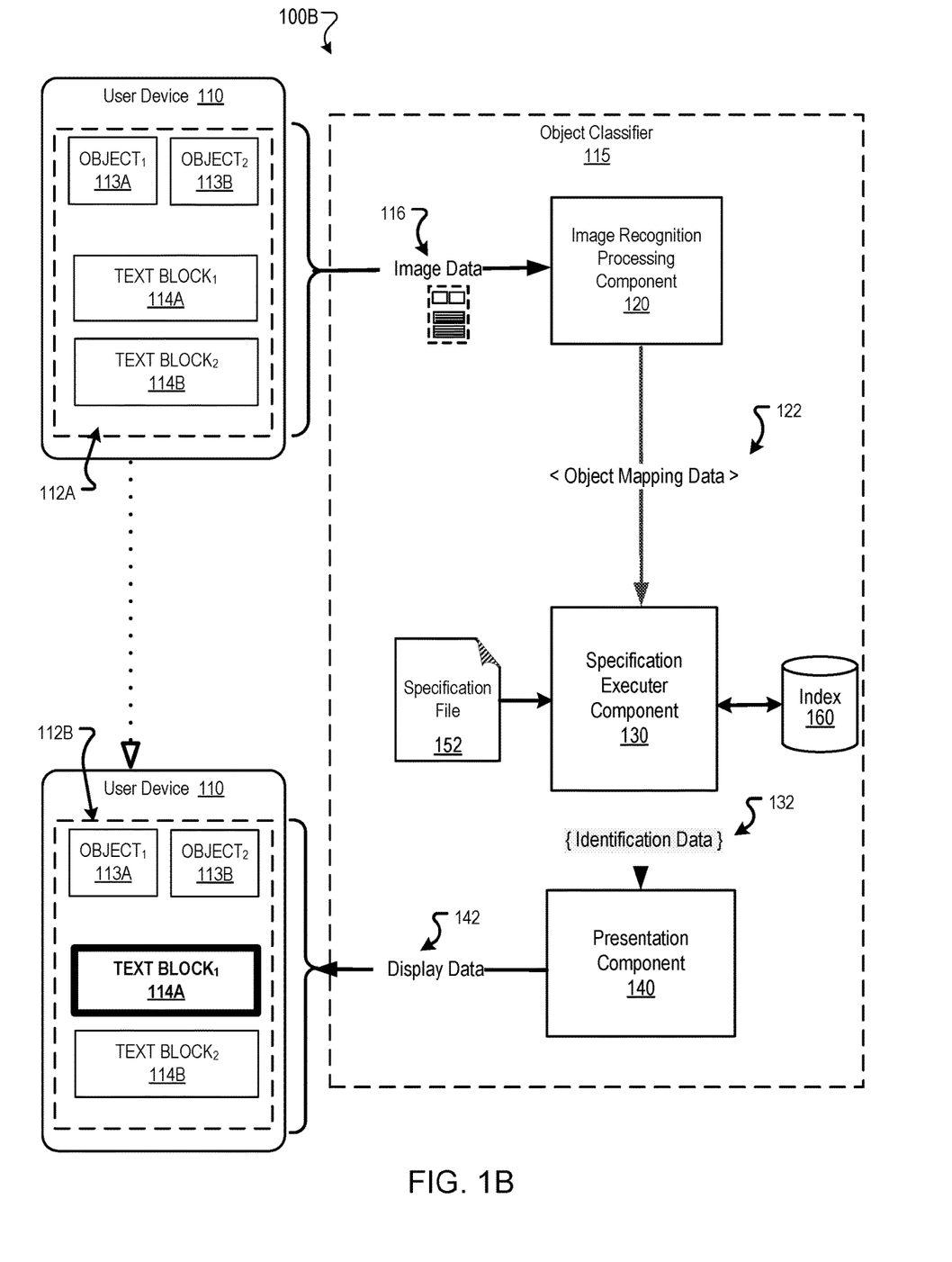
FIG. 1B is a system flow diagram of an example user device in which an object classifier can be implemented.

FIG. 1A is a block diagram of an example environment 100A in which an object classifier 115 can be implemented. FIG. 1B is a system flow diagram of an example environment 100B in which an object classifier 115 can be implemented with a user device 110.

A computer network 102, such as a local area network (LAN), wide area network (WAN), the Internet, or a combination thereof, connects a classification server 104 and user devices 110. The classification server 104 may represent a combination of application servers, database servers, communication servers, web servers, and the like that includes the systems of a mobile platform provider used to collect classification data from, control, and manage the classification applications and classification modules used on various user devices 110 described herein.

A user device 110 is an electronic device capable of requesting and receiving resources over the network 102. Example user devices 110 include personal computers, mobile communication devices, and other devices that can send and receive data over the network 102. A user device 110 typically includes a user application, such as a web browser or some other application, to facilitate the sending and receiving of data over the network 102. The user device 110 can present media using an application. Media is images, video, audio, text, or some combination of the like that a user consumes using an application running on a user device 110. The web browser can enable a user to display and interact with text, images, videos, music and other information typically located on a web page at a website on the World Wide Web or a local area network.

The library server 104 includes a library generator 150. Although the library generator 150 is shown as implemented in the library server 104, the library generator 150 can be implemented in some other computer system and the resulting specification files 152 it generates can be provided to the library server 104. For example, if the library server 104 is part of an application store, the specification files 152 may be developed by use of library generators 150 hosted by developer servers.

The library generator 150 receives object classifications of interest from a developer to generate a specification file 152. The specification file 152 is later provided to a user device that is executing specification executer 130. The particular object classification of interest will depend on the intent of the specification file. For example, if the specification file 152 is to be used to identify gluten free menu items, the object classifications of interest may be text items and symbols that indicate gluten free items. Likewise, if the specification file 152 is to be used to identify dogs in images, the object classifications of interest may image data that is used by an image processing system that causes the image processing system to process an image using a model trained to identify dogs.

The data stored in the specification file 152 that indicates object classifications of interest may be depend on the image processing systems used. For example, textual classifications may include the text to be recognized, and classifications of the text, if a text processing model receives such data as input. Likewise, an image processing system may access multiple different object recognition models, each identified by a unique identifier. If the specification file indicates dogs are to be identified, then the speciation file may store the identifier for a model trained to recognized dogs. Of course, multiple models identifiers may be stored in a specification file 152 for the recognition of multiple different object types.

The specification file 152 may also specify presentation data. For example, when an object depicted in the image is determined to belong to the object classification of interest, the system can identify in the image the specific portions of interest with either a circle around the object, highlight the object, or the system could audibly describe the object. Which form of presentation is used is specified by the presentation data. Accordingly, each specification file 152 can be used to identify particular objects in an image and to present the positive identifications in particular ways, as specified by their respective developers.

A user device 110, using the object classifier system 115, includes an image recognition processor 120, a specification executer 130, a presentation engine 140, and a specification file 150. The image recognition processor 120 may be implemented on the user device 110, or, alternatively, in a separate computer system, such as a classification server 105.

Figure 2:
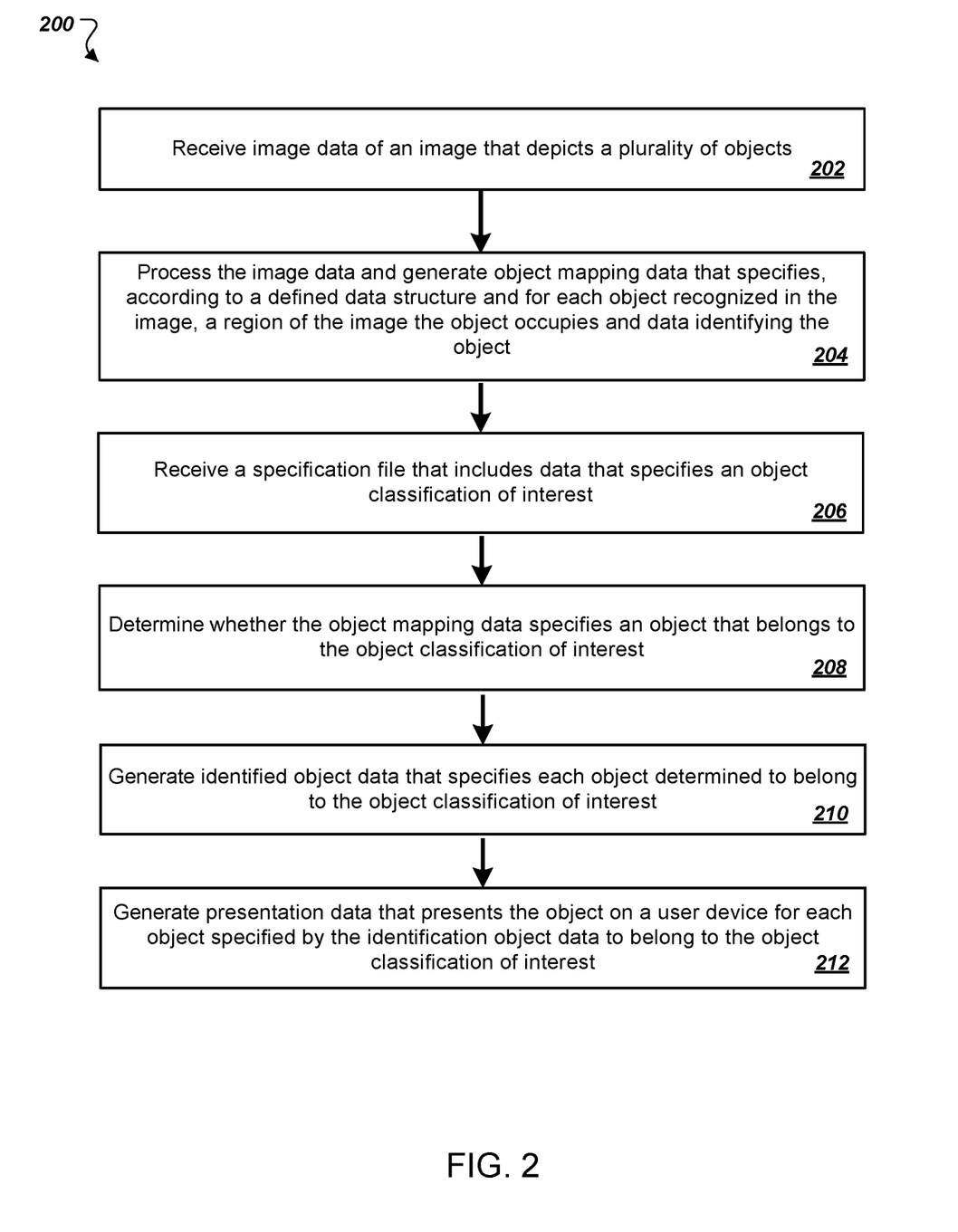
FIG. 2 is a flowchart of an example process for using an object classifier.

FIG. 2 is a flow diagram of an example process 200 for using an object classifier.

The process 200 receives image data of an image that depicts a plurality of objects (202). According to some implementations, the plurality of objects may be one or more of text or a real-world physical object. As shown in FIG. 1B, the image recognition processing component 120 of the object classifier 115 can receive image data 116 from user device 110. The image data 116 can include the objects 113A and 113B and text blocks 114A and 114B, as viewed within the user interface 112A. For example, the image data 116 may be an image of a menu that may include pictures, text blocks, or a combination thereof, of menu items.

The process 200 processes the image data and generates object mapping data that specifies for each object recognized in the image, and according to a defined data structure, e.g., X and Y components, or some other data structure that can be used to map into a location of an image, a region of the image the object occupies and data identifying the object (204). As shown in FIG. 1B, the image recognition processing component 120 receives the image data 116 from the user device 110 and generates and sends object mapping data 122 to the specification executer 130. For example, the image recognition processor 120 will process the image data 116 of the user interface 112A and identify objects and text blocks, such as object 113A and 113B and text blocks 114A and 114B, in the image based on a defined data structure.

The process 200 accesses a specification file that includes data that specifies an object classification of interest (206). As shown in FIG. 1B, specification file 152 is accessed by the specification executer 130. The specification file 152 may have been downloaded from the library server 104 by the user at an earlier time.

The process 200, after receiving the object mapping data (204) and the specification file (206), determines whether the object mapping data specifies an object that belongs to the object classification of interest (208). As shown in FIG. 1B, the specification executer 130 receives object mapping data 122 from the image recognition processor 120 and the specification file 152, and then the image recognition processor 120 determines whether any objects or text blocks marked in the object mapping data 122 belong to what the user specified in the user input 111 as being interested in. For example, referring to the user interface 112A of FIG. 1B, the specification executer 130 can make the determination of whether object 113A, object 113B, text block 114A, and/or text block 114B are identified as what the user selected as being interested in. Further, for example, referring back to the "gluten free" example, the specification executer 130 can make the determination of whether any mapped text objects from the image data 116 of a menu are identified as "gluten free." For example, the menu time may include the words "gluten free" or an image symbol that indicates a menu item is gluten free.

The process 200 generates identified object data that specifies each object determined to belong to the object classification of interest (210). As used in this document, identified object data is data that indicates that an identified object belongs to the classification of interest. As shown in FIG. 1B, the specification executer 130 generates and sends identified object data 132 to the presentation component 140. The presentation engine 140 receives the identified object data 132 and, for each object specified by the identified object data 132 that is determined to belong to the object classification of interest, also receives the object mapping data 122 specifying the region of the image the object occupies. For example, continuing with the example that text block 114B was the only object in the object mapping data 122 from the image recognition processor 120 to be determined by the specification executor 130 as an object of interest according to the specification file 152, then the specification executor 130 would send the identified object data 132 specifying only the portion of the object mapping data 122 that specifies the region of the image of the user interface 112A that text block 114B occupies.

The process 200 generates presentation data that presents the object on a user device for each object specified by the identified object data to belong to the object classification of interest (212). As shown in FIG. 1B, the presentation engine 140 receives the identified object data 132 and the specific object mapping data 122, and generates and sends presentation data 142 to the user device 110 to be displayed on the user device 110 through the user interface 112B. For example, continuing with the example that text block 114B as the only object determined to be of interest to the user, the presentation data 142 now shows text block 114B as illuminated or highlighted on user interface 112B when compared to the same appearance of user interface 112A. This example assumes then, that the user selected to highlight the object of interest as part of the presentation mode included in the user input 111 as discussed herein.

According to some implementations, the object classification of interest defines a text classification of interest and the presentation engine 140 can cause the user device 110 to highlight, within the image, the object depicted in the image that is determined to belong to the text classification of interest.

Figure 3:
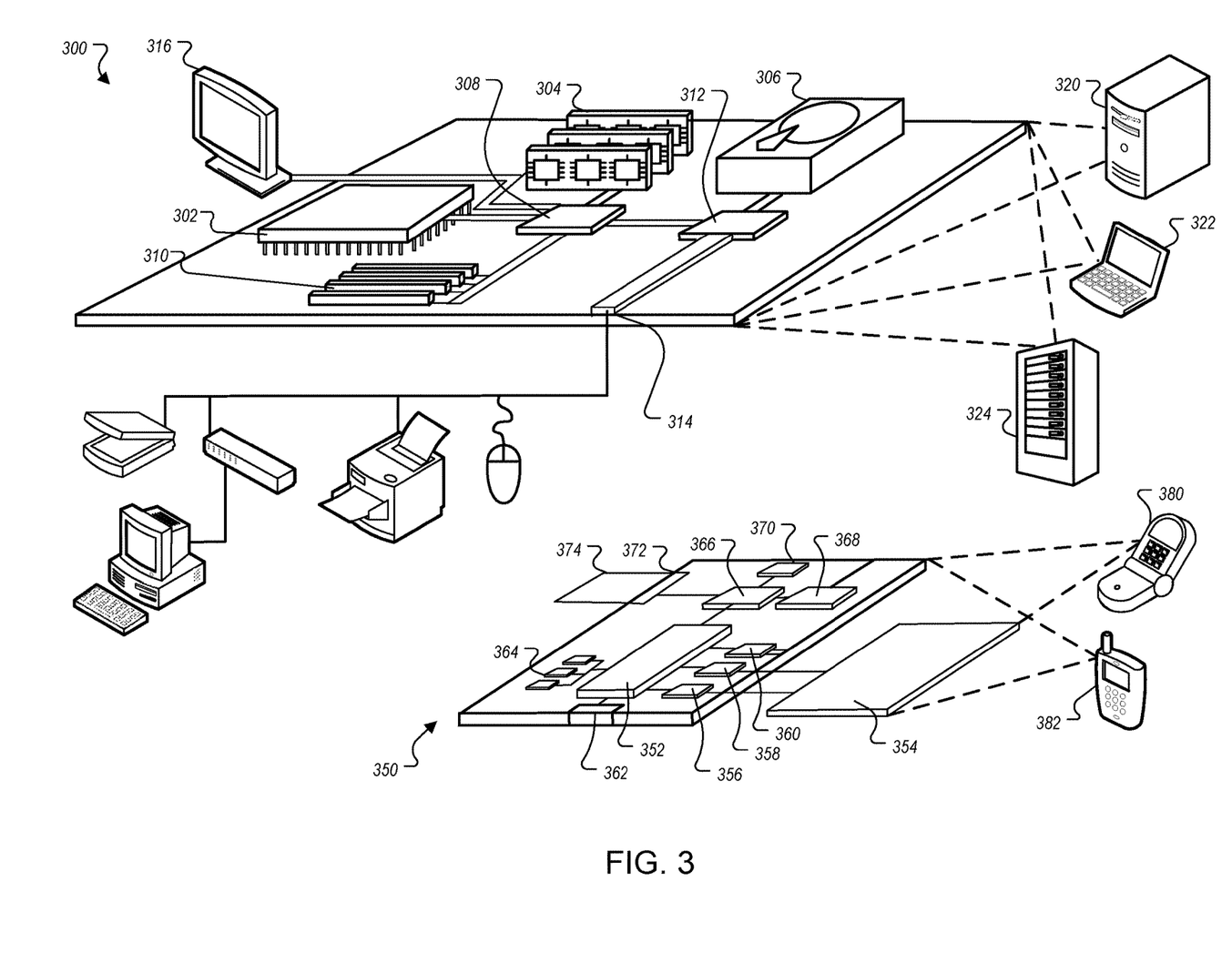
FIG. 3 is a block diagram of an example computer system that can be used to implement the methods, systems and processes described in this disclosure.

FIG. 3 is a block diagram of example computing devices 300, 350 that can be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 300 is further intended to represent any other typically non-mobile devices, such as televisions or other electronic devices with one or more processers embedded therein or attached thereto. Computing device 350 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 300 includes a processor 302, memory 304, a storage device 306, a high-speed controller 308 connecting to memory 304 and high-speed expansion ports 310, and a low-speed controller 312 connecting to low-speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high-speed controller 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high-speed controller 308 manages bandwidth-intensive operations for the computing device 300, while the low-speed controller 312 manages lower bandwidth-intensive operations. Such allocation of duties is an example only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed bus 314. The low-speed bus 314 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as computing device 350. Each of such devices may contain one or more of computing devices 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The computing device 350 may also be provided with a storage device, such as a micro-drive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the computing device 350, such as control of user interfaces, applications run by computing device 350, and wireless communication by computing device 350.

Processor 352 may communicate with a user through control interface 358 and display interface 356 coupled to a display 354. The display 354 may be, for example, a TFT LCD display or an OLED display, or other appropriate display technology. The display interface 356 may include appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of computing device 350 with other devices.

External interface 362 may provide, for example, for wired communication (e.g., via a docking procedure) or for wireless communication (e.g., via Bluetooth® or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to computing device 350 through expansion interface 372, which may include, for example, a subscriber identification module (SIM) card interface. Such expansion memory 374 may provide extra storage space for computing device 350, or may also store applications or other information for computing device 350. Specifically, expansion memory 374 may include instructions to carry out or supplement the processes described above, and may include secure information also. Thus, for example, expansion memory 374 may be provide as a security module for computing device 350, and may be programmed with instructions that permit secure use of computing device 350. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 368 (e.g., a radio-frequency transceiver). In addition, short-range communication may occur, such as using a Bluetooth®, WiFi, or other such transceiver (not shown). In addition, GPS receiver module 370 may provide additional wireless data to computing device 350, which may be used as appropriate by applications running on computing device 350.

Computing device 350 may also communicate audibly using audio codec 360, which may receive spoken information from a user and convert it to usable digital information. Audio codec 360 may likewise generate audible sound for a user, such as through a speaker, e.g., in a handset of computing device 350. Such sound may include sound from voice telephone calls, may include recorded sound (e.g., voice messages, music files, etc.) and may also include sound generated by applications operating on computing device 350.

The computing device 350 may be implemented in a number of different forms, as shown in the figure. For example, it may be implemented as a cellular telephone 380. It may also be implemented as part of a smartphone 382, personal digital assistant, or other mobile device.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system implemented on a user device, comprising:
   an image recognition processing component on the user device that:

receives, as input, image data and processes the image data of an image that depicts a plurality of objects, the image data captured by the user device; and generates, as output, object mapping data that specifies, according to a defined data structure and for each object recognized in the image, a region of the image the object occupies and data identifying the object;

a specification executer component on the user device that:

receives, as input, object mapping data from an image recognition processing component, wherein the object mapping data specifies, for each object recognized in an image and according to a defined data structure, a region of the image the object occupies and data identifying the object;

receives, as input, a specification file that includes data that specifies an object classification of interest;

determines whether the object mapping data generated by the image recognition processing component specifies an object that belongs to the object classification of interest; and generates, as output, identified object data that specifies each object determined to belong to the object classification of interest; and a presentation component on the user device that:

receives, as input, the identified object data and, for each object specified by the identified object data that is determined to belong to the object classification of interest, the object mapping data specifying the region of the image the object occupies; and for each object specified by the identified object data to belong to the object classification of interest, generates presentation data that presents the object on a user device.

2. The system of claim 1, wherein the specification file is generated by a library generator that:

receives, from a developer, input specifying one or more object classifications of interest;

receives, from the developer, input specifying a presentation mode for presenting each object depicted in an image that is determined to belong to the object classification of interest; and generates, based on the developer input specifying one or more object classifications of interest and the user input specifying the presentation mode, the specification file.

3. The system of claim 1, wherein the data generated by the presentation component to present the object of interest is data that is generated according to the presentation mode specified in the specification file.

4. The system of claim 1, wherein the presentation component causes the user device to highlight, within the image, the object depicted in the image that is determined to belong to the object classification of interest.

5. The system of claim 1, wherein the object is one or more of text or a real-world physical object.

6. The system of claim 1, wherein the object classification of interest defines a text classification of interest and wherein the presentation component causes the user device to highlight, within the image, the object depicted in the image that is determined to belong to the text classification of interest.

7. A system, comprising:

a specification executer component that:

receives, as input, object mapping data from an image recognition processing component, wherein the object mapping data specifies, for each object recognized in an image and according to a defined data structure, a region of the image the object occupies and data identifying the object;

receives, as input, a specification file that includes data that specifies an object classification of interest;

determines whether the object mapping data generated by the image recognition processing component specifies an object that belongs to the object classification of interest; and generates, as output, identified object data that specifies each object determined to belong to the object classification of interest; and a presentation component that:

receives, as input, the identified object data and, for each object specified by the identified object data that is determined to belong to the object classification of interest, the object mapping data specifying the region of the image the object occupies; and for each object specified by the identified object data to belong to the object classification of interest, generates presentation data that presents the object on a user device;

wherein the presentation component causes the user device to audibly describe the object depicted in the image that is determined to belong to the object classification of interest.

8. A computer-implemented method, comprising:

receiving at a user device, as input, object mapping data, wherein the object mapping data specifies, for each object recognized in an image and according to a defined data structure, a region of the image the object occupies and data identifying the object;

receiving at a user device, as input, a specification file that includes data that specifies an object classification of interest;

determining, at the user device, whether the object mapping data specifies an object that belongs to the object classification of interest;

generating at the user device, as output, identified object data that specifies each object determined to belong to the object classification of interest; and for each object specified by the identified object data to belong to the object classification of interest, generating at the user device, based on the identified object data and the object mapping data specifying the region of the image the object occupies, presentation data that presents the object on a user device.

9. The computer-implemented method of claim 8, further comprising:

receiving, as input, image data of an image that depicts a plurality of objects; and generating, as output, object mapping data that specifies, according to a defined data structure and for each object recognized in the image, a region of the image the object occupies and data identifying the object.

10. The method of claim 8, further comprising:

receiving, from a developer, input specifying one or more object classifications of interest;

receiving, from the developer, input specifying a presentation mode for presenting each object depicted in an image that is determined to belong to the object classification of interest; and generating, based on the developer input specifying one or more object classifications of interest and the user input specifying the presentation mode, the specification file.

11. The computer-implemented method of claim 8, wherein the data generated to present the object of interest is data that is generated according to the presentation mode specified in the specification file.

12. The computer-implemented method of claim 8, wherein a presentation component causes the user device to highlight, within the image, the object depicted in the image that is determined to belong to the object classification of interest.

13. The computer-implemented method of claim 8, wherein the object is one or more of text or a real-world physical object.

14. The computer-implemented method of claim 8, wherein the object classification of interest defines a text classification of interest, the method further comprising causing the user device to highlight, within the image, the object depicted in the image that is determined to belong to the text classification of interest.

15. A non-transitory computer storage medium encoded with a computer program, the computer program comprising instructions that when executed by a data processing apparatus in a user device cause the data processing apparatus to perform operations comprising:
   receiving at the user device, as input, image data of an image that depicts a plurality of objects, the image data captured by the user device;
   generating at the user device, as output, object mapping data that specifies, according to a defined data structure and for each object recognized in the image, a region of the image the object occupies and data identifying the object;
   receiving at the user device, as input, the object mapping data, wherein the object mapping data specifies, for each object recognized in an image and according to a defined data structure, a region of the image the object occupies and data identifying the object;
   receiving at the user device, as input, a specification file that includes data that specifies an object classification of interest;
   determining at the user device whether the object mapping data specifies an object that belongs to the object classification of interest; and
   generating at the user device, as output, identified object data that specifies each object determined to belong to the object classification of interest;
   receiving at the user device, as input, the identified object data and, for each object specified by the identified object data that is determined to belong to the object classification of interest, the object mapping data specifying the region of the image the object occupies; and
   for each object specified by the identified object data to belong to the object classification of interest, generating at the user device presentation data that presents the object on a user device.

16. The non-transitory computer storage medium of claim 15, further comprising:
   receiving user input specifying one or more object classifications of interest;
   receiving user input specifying a presentation mode for presenting each object depicted in an image that is determined to belong to the object classification of interest; and
   generating, based on the user input specifying one or more object classifications of interest and the user input specifying the presentation mode, a specification file.

17. The non-transitory computer storage medium of claim 15, wherein the data generated to present the object of interest is data that is generated according to the presentation mode specified in the specification file.

18. A computer-implemented method, comprising:
   receiving, as input, object mapping data, wherein the object mapping data specifies, for each object recognized in an image and according to a defined data structure, a region of the image the object occupies and data identifying the object;
   receiving, as input, a specification file that includes data that specifies an object classification of interest;
   determining whether the object mapping data specifies an object that belongs to the object classification of interest;
   generating, as output, identified object data that specifies each object determined to belong to the object classification of interest; and
   for each object specified by the identified object data to belong to the object classification of interest, generating, based on the identified object data and the object mapping data specifying the region of the image the object occupies, presentation data that presents the object on a user device;
   further comprising causing the user device to audibly describe the object depicted in the image that is determined to belong to the object classification of interest;
   wherein the specification file is generated by:
      receiving, from a developer, input specified by the developer that specifies one or more object classifications of interest;
      receiving, from the developer, input specifying a presentation mode for presenting each object depicted in an image that is determined to belong to the object classification of interest; and
      generating, based on the developer input specifying one or more object classifications of interest and the developer input specifying the presentation mode, the specification file.

* * * * *